US009672033B2

(12) United States Patent
Pechanek et al.

(10) Patent No.: US 9,672,033 B2
(45) Date of Patent: Jun. 6, 2017

(54) METHODS AND APPARATUS FOR TRANSFORMING, LOADING, AND EXECUTING SUPER-SET INSTRUCTIONS

(75) Inventors: Gerald George Pechanek, Cary, NC (US); Larry D. Larsen, Vilas, NC (US)

(73) Assignee: Altera Corporation, San Jose, CA (US)

( * ) Notice: Subject to any disclaimer, the term of this patent is extended or adjusted under 35 U.S.C. 154(b) by 1324 days.

(21) Appl. No.: 12/350,610

(22) Filed: Jan. 8, 2009

(65) Prior Publication Data

US 2009/0119489 A1 May 7, 2009

Related U.S. Application Data

(63) Continuation of application No. 10/985,264, filed on Nov. 10, 2004, now Pat. No. 7,493,474.

(51) Int. Cl.
*G06F 15/00* (2006.01)
*G06F 9/30* (2006.01)
*G06F 9/38* (2006.01)

(52) U.S. Cl.
CPC ........ *G06F 9/30014* (2013.01); *G06F 9/3013* (2013.01); *G06F 9/30036* (2013.01); *G06F 9/30047* (2013.01); *G06F 9/30112* (2013.01); *G06F 9/30149* (2013.01); *G06F 9/30174* (2013.01); *G06F 9/382* (2013.01); *G06F 9/3853* (2013.01); *G06F 9/3885* (2013.01)

(58) Field of Classification Search
USPC ........................................................ 712/209
See application file for complete search history.

(56) References Cited

U.S. PATENT DOCUMENTS 4,437,149 A * 3/1984 Pomerene et al. ............ 712/213
5,649,135 A * 7/1997 Pechanek et al. ............ 712/200
5,828,895 A * 10/1998 Chan et al. ..................... 712/23

* cited by examiner

*Primary Examiner* — Corey S Faherty

(57) ABSTRACT

Techniques are described for loading decoded instructions and super-set instructions in a memory for later access. For loading a decoded instruction, the decoded instruction is a transformed form of an original instruction that was stored in the program memory. The transformation is from an encoded assembly level format to a binary machine level format. In one technique, the transformation mechanism is invoked by a transform and load instruction that causes an instruction retrieved from program memory to be transformed into a new language format and then loaded into a transformed instruction memory. The format of the transformed instruction may be optimized to the implementation requirements, such as improving critical path timing. The transformation of instructions may extend to other needs beyond timing path improvement, for example, requiring super-set instructions for increased functionality and improvements to instruction level parallelism. Techniques for transforming, loading, and executing super-set instructions are described.

21 Claims, 13 Drawing Sheets

FIG. 4

Summary of 16-bit Processor Pipeline Stages for a Decode and Load Transformed VLIW Instruction Type

| CLOCK CYCLE | PREPARATION STAGES | | | EXECUTION STAGES | | | |
|---|---|---|---|---|---|---|---|
| | 1 | 2 | 3 | 4 | 5 | 6 | 7 |
| T | FETCH PE LTV & DISTRIBUTE LTV (404) | | | | | | |
| T+1 | | DECODE PE LTV, GEN TVIM ADDRESS, SET LoadTVIM, FETCH 1st SLOT INSTRUCTION & DISTRIBUTE (408) | | | | | |
| T+2 | | | TRANSFORM & LOAD 1st SLOT & UAF, FETCH 2nd SLOT INSTRUCTION & DISTRIBUTE (412) | | | | |
| T+3 | | | | TRANSFORM & LOAD 2nd SLOT, FETCH 3rd SLOT INSTRUCTION & DISTRIBUTE (416) | | | |
| T+4 | | | | | TRANSFORM & LOAD 3rd SLOT, FETCH 4th SLOT INSTRUCTION & DISTRIBUTE (420) | | |
| T+5 | | | | | | TRANSFORM & LOAD 4th SLOT, FETCH 5th SLOT INSTRUCTION & DISTRIBUTE (424) | |
| T+6 | | | | | | | TRANSFORM & LOAD 5th SLOT (428) |

FIG. 5

| INSTRUCTION TYPE | SUMMARY OF 16-BIT PROCESSOR PIPELINE STAGES FOR SEVEN DIFFERENT 16-BIT INSTRUCTION TYPES | | | | | |
|---|---|---|---|---|---|---|
| | PREPARATION STAGES | | | EXECUTION STAGES | | |
| | FETCH | DTAV | DECODE | Execute1 | CondRet-1 & Execute2 | CondRet-2 |
| STORE | FETCH & DISTRIBUTE | EARLY DECODE | DECODE, READ ARF/CRF, ADDRESS GEN & WRITE ARF | READ SP/PE CRF & WRITE MEMORY | | |
| LOAD | FETCH & DISTRIBUTE | EARLY DECODE | DECODE, READ ARF/CRF, ADDRESS GEN & WRITE ARF | FETCH SP/PE MEMORY DATA & WRITE CRF | | |
| LOAD BROADCAST | FETCH & DISTRIBUTE | EARLY DECODE | DECODE, READ ARF, ADDRESS GEN & WRITE ARF | FETCH SP MEMORY DATA & WRITE PEs' CRF | | |
| LOAD ADDRESS | FETCH & DISTRIBUTE | EARLY DECODE | DECODE, READ ARF, ADDRESS GEN & WRITE ARF | | | |
| 1-CYCLE EXECUTES | FETCH & DISTRIBUTE | EARLY DECODE | DECODE | READ CRF, EXECUTE-1, WRITE CRF | CONDITION RETURN-1 | CONDITION RETURN-2 |
| 2-CYCLE EXECUTES | FETCH & DISTRIBUTE | EARLY DECODE | DECODE | READ CRF, EXECUTE-1 TO BUFFER REG | READ BUFFER REG/CRF, EXECUTE-2, WRITE CRF | |
| EXECUTE VLIW (XV) | FETCH & DISTRIBUTE | DECODE XV & GEN VIM ADDRESS & FETCH PRE-DECODE1 VLIW FROM VIM | DECODE, STORE SLOT: READ ARF/CRF, ADDRESS GEN & WRITE ARF | READ SP/PE CRF & WRITE MEMORY | | |
| | | | DECODE, LOAD SLOT: READ ARF/CRF, ADDRESS GEN & WRITE ARF | FETCH SP MEMORY DATA & WRITE CRF | | |
| | | | DECODE ALU, MAU & DSU (1 CYCLE) | READ CRF, EXECUTE-1, WRITE CRF | CONDITION RETURN-1 | CONDITION RETURN-2 |
| | | | DECODE2 ALU & MAU (2 CYCLE) | READ CRF, EXECUTE-1 TO BUFFER REG | READ BUFFER REG/CRF, EXECUTE-2, WRITE CRF | |

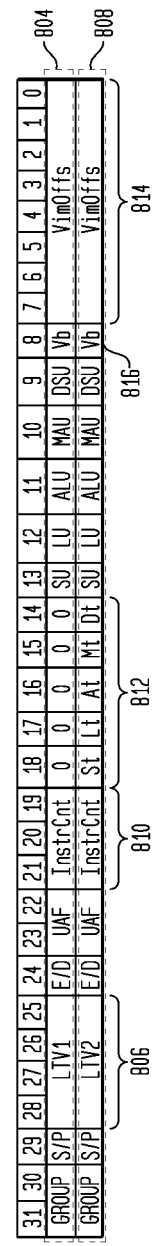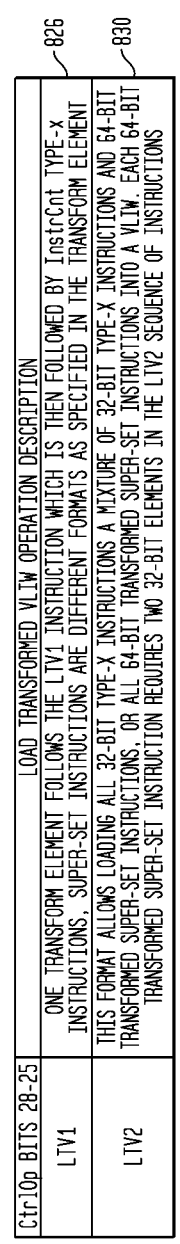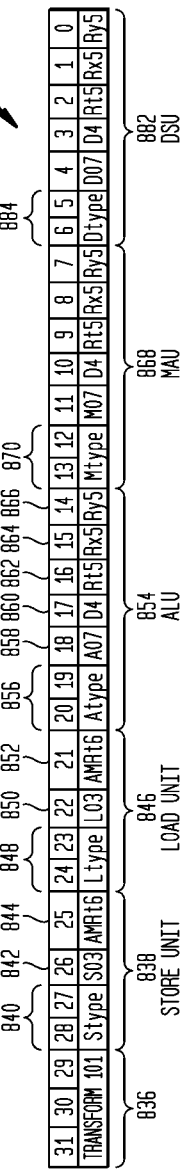
FIG. 8A
FIG. 8B
FIG. 8C

FIG. 9A

TYPE-x BASIC ARITHMETIC INSTRUCTION FORMAT (ALU, MAU AND DSU)

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | S/P | UNIT | 6bit OPCODE | | | | | | | 5bit Rt | | | | | 5bit Rx | | | | | 5bit Ry | | | | | CE3 | | | 3bit Dtype | | |

FIG. 9B

TYPE-x BASIC ALU INSTRUCTION IN SLAMD VLIW AS LOADED IN VIM

| LOAD | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | MAU | ... |
|---|---|---|---|---|---|---|---|---|---|---|---|---|---|---|---|---|---|---|---|---|---|---|---|---|---|---|---|---|---|---|
| | S/P | 6bit ALU OPCODE | | | | | | 5bit Rt | | | | | 5bit Rx | | | | | 5bit Ry | | | | | CE3 | | | 3bit Dtype | | | | |

FIG. 9C

TYPE-x ALU INSTRUCTION AND A SUPER-SET ALU INSTRUCTIONS IN A SLAMD VLIW AS LOADED IN TVIM AT TWO ADJACENT TVIM ADDRESSES

| LOAD | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | MAU | ... | ... |
|---|---|---|---|---|---|---|---|---|---|---|---|---|---|---|---|---|---|---|---|---|---|---|---|---|---|---|---|---|---|---|---|---|---|---|---|---|---|---|---|
| | 0 | 0 | 0 | S/P | nu | 6bit ALU OPCODE | | | | | | 5bit Rt | | | | | 5bit Rx | | | | | 5bit Ry | | | | | CE3 | | | nu | 3bit Dtype | | | | | | | |
| ... | 0 | 0 | 0 | 1 | S/P | 7bit ALU OPCODE | | | | | | | 6bit Rt | | | | | | 6bit Rx | | | | | | 6bit Ry | | | | | | CE3 | | | 4bit Dtype | | | | | |

FIG. 10

SUMMARY OF PIPELINE STAGES FOR LOAD TRANSFORMED VLIW (LTV1) INSTRUCTION WITH TRANSFORM ELEMENT — 1000

| CLOCK CYCLE | PREPARATION STAGES | | EXECUTION STAGES | | | | | |
|---|---|---|---|---|---|---|---|---|
| | 1 | 2 | 3 | 4 | 5 | 6 | 7 | 8 |
| T | FETCH LTV1 & DISTRIBUTE LTV1 | | | | | | | |
| T+1 | | DECODE LTV1, GEN TVIM ADDRESS, SET LoadTV1mode FETCH TRANSFORM ELEMENT & DISTRIBUTE | | | | | | |
| T+2 | | | LOAD TRANSFORM ELEMENT IN TRANSFORM UNITS, FETCH 1st INSTR. & DISTRIBUTE | | | | | |
| T+3 | | | | TRANSFORM & LOAD 1st SLOT, FETCH 2nd INSTR. & DISTRIBUTE | | | | |
| T+4 | | | | | TRANSFORM & LOAD 2nd SLOT, FETCH 3rd INSTR. & DISTRIBUTE | | | |
| T+5 | | | | | | TRANSFORM & LOAD 3rd SLOT, FETCH 4th INSTR. & DISTRIBUTE | | |
| T+6 | | | | | | | TRANSFORM & LOAD 4th SLOT, FETCH 5th INSTR. & DISTRIBUTE | |
| T+7 | | | | | | | | TRANSFORM & LOAD 5th SLOT, FETCH NEXT INSTR. |

1004, 1008, 1012, 1016, 1020, 1024, 1028, 1032

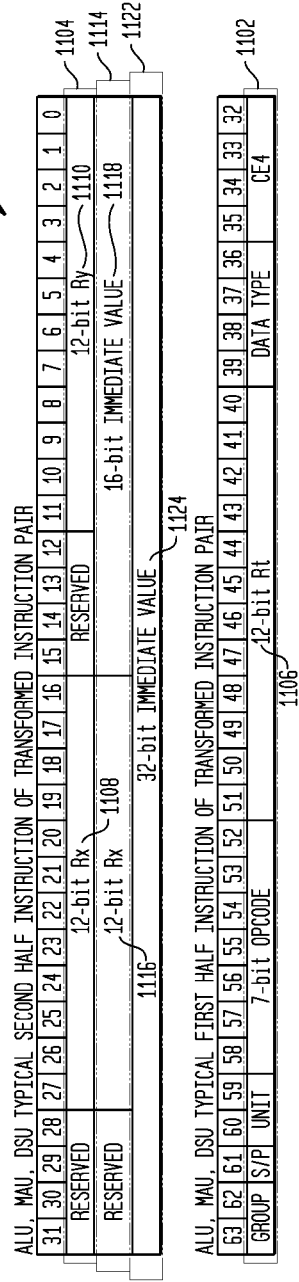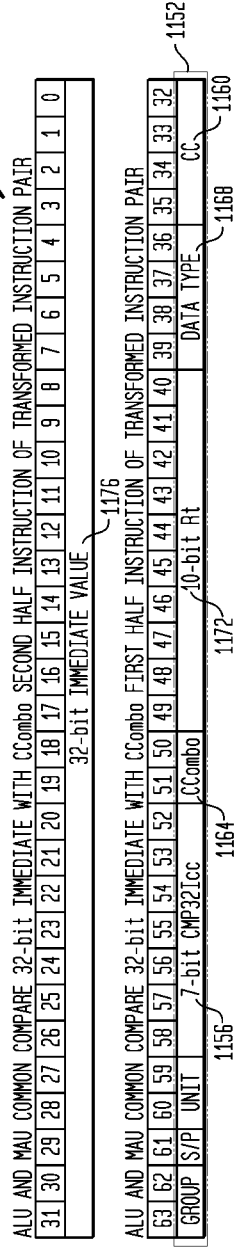
FIG. 11A
FIG. 11B

FIG. 12

LTV2 LOADING FIVE TRANSFORMED 64-BIT INSTRUCTIONS INTO A TVIM — 1200

| CLOCK CYCLE | PREPARATION STAGES | | EXECUTION STAGES | | | | | | | | | |
|---|---|---|---|---|---|---|---|---|---|---|---|---|
| | 1 | 2 | 3 | 4 | 5 | 6 | 7-9 | 10 | 11 | 12 | | |
| T | FETCH LTV2 & DISTRIBUTE | | | | | | | | | | | |
| T+1 | | DECODE LTV2 & GEN TVIM ADDRESS, SET LoadTV2mode, FETCH 1st I32b.A & DISTRIBUTE | | | | | | | | | | |
| T+2 | | | LOAD 1st I32b.A INTO TRANSFORM UNITS, FETCH 1st I32b.B & DISTRIBUTE | | | | | | | | | |
| T+3 | | | | TRANSFORM & LOAD 1st SLOT, FETCH 2nd I32b.A | | | | | | | | |
| T+4 | | | | | LOAD 2nd I32b.A INTO TRANSFORM UNITS, FETCH 2nd I32b.B | | | | | | | |
| T+5 | | | | | | TRANSFORM & LOAD 2nd SLOT, FETCH 3rd I32b.A | 1210 | | | | | |
| T+6-8 | | | | | | | ... | | | | | |
| T+9 | | | | | | | | TRANSFORM & LOAD 4th SLOT, FETCH 5th I32b.A | | | | |
| T+10 | | | | | | | | | LOAD 5th I32b.A INTO TRANSFORM UNITS, FETCH 5th I32b.B | | |
| T+11 | | | | | | | | | | TRANSFORM & LOAD 5th SLOT, FETCH NEXT INSTRUCTION | | ns under specific rules governed by the compressed instruction format. For example, a specific rule may be a reduced register file address space for accessing operands, or having the same target register address for both operations.

METHODS AND APPARATUS FOR TRANSFORMING, LOADING, AND EXECUTING SUPER-SET INSTRUCTIONS

FIELD OF THE INVENTION

The present invention relates generally to advantageous techniques for improving processor performance. In particular, the present invention relates to pipeline improvements and the use of superset instructions. By way of example, processors can be improved by transforming instructions into a super-set form, storing transformed instructions in a secondary memory for program selection, storing multiple transformed instructions in a VLIW memory, and executing the super-set instructions singly or as a VLIW.

BACKGROUND OF THE INVENTION

The performance of a processor is, in part, dependent upon how efficient the processor's instruction set architecture performs in an intended application program. By evaluating the processor's use in the intended application program, areas for improvement in the processor's instruction set are many times recognized. With a processor already being used in an existing product or application, extending the processor's instruction set to address recognized areas for improvement, for example, providing additional instruction types, support of additional data types, support for increased capacity register files, and improved conditional execution capabilities, is a difficult problem. This problem is due to the need to maintain support of the original instruction set architecture while providing super-set instruction capabilities and to the limited room for growth usually available in the original instructions' formats. An attempt to address such issues was described in an IBM Technical Disclosure Bulletin (TDB) titled "Selecting Predecoded Instructions with a Surrogate", dated August, 1992.

The "Selecting Predecoded Instructions with a Surrogate" TDB, dated August, 1992, describes the idea of storing predecoded (no instruction decode required) instructions in a special on-chip predecoded instruction memory (PDIM) and selecting individual predecoded instructions to be executed by use of "surrogate" instructions placed in the native instruction stream. The particular processor architecture for which this idea was originally proposed was a processor utilizing a 3-stage pipeline. That pipeline posed implementation problems in executing the surrogate instruction which, as part of its execution, caused a predecoded instruction to be fetched from the PDIM and then executed in place of the surrogate instruction. One of the implementation problems concerned situations requiring that a data memory effective address (EA) be resolved for a predecoded instruction selected for execution. The solution described in the TDB article involved including a component of the effective address in a field in the surrogate instruction itself. This was done so that the surrogate provided address component could be used in a simplified address resolution process during the decode stage of the surrogate instruction while the pre-decoded instruction was being accessed from the PDIM. In the TDB article, the address component included in the surrogate instruction was illustrated to be 16-bits out of a 32-bit surrogate instruction format. The TDB article also indicated the instruction to be decoded and stored in decoded form in the PDIM could be a compound instruction. A compound instruction is typically one in which two instructions are compressed into a single instruction format while specifying operations of the two instructions under specific rules governed by the compressed instruction format. For example, a specific rule may be a reduced register file address space for accessing operands, or having the same target register address for both operations.

The use of 16-bits, half of the available surrogate 32-bit instruction format, for address generation purposes, poses a severe restriction on defining the surrogate instruction. If the 16-bit address component was not required in the surrogate instruction, these 16-bits could be used for other purposes. Also, due to the limited 16-bit space remaining in the surrogate instruction, it is difficult to include additional control information such as the type of effective address generation required, further limiting the usefulness of this approach. The surrogate definition problem becomes even more difficult depending upon the number of address resolutions required by the pre-decoded instruction. Consider a surrogate compound instruction requiring address resolutions to support a memory load operation and a memory store operation, both operations to be simultaneously executed when selected by the single surrogate instruction. As specified by the TDB, the load and store operations would require the surrogate instruction to provide address components for both the load and store operations. The specification of two address components in a single 32-bit surrogate instruction is a difficult task to adequately support within a constrained space such as 16-bits for most typical processors and their associated memory subsystems.

A further problem concerns the memory space required to store predecoded instructions according to the approach of the TDB. For example, consider the storage requirements for a PDIM in a hypothetical 32-bit instruction processor. A predecoded 32-bit instruction would require extensive storage, in most typical cases. For example, predecoding a 6-bit opcode and a 4 dbit data type field would require 64-bits and 16-bits, respectively. Without any further predecoding, storage space for 80 predecoded bits and 22 instruction bits would be required. Since full decoding was required by the TDB article, greater than 102 bits would generally be required for a predecoded 32-bit instruction. With K predecoded instructions, a memory of Kx(>192-bits) would be needed and may not be justifiable given the chip area required to implement. As can be seen, there are a number of difficulties presented by the prior art TDB.

SUMMARY OF THE INVENTION

Among its several aspects, due to the difficulty in defining surrogate instructions to provide adequate effective address information for stored predecoded instructions and due to the increased storage requirements of the TDB technique, the present invention recognizes that a need exists for providing super-set instruction capabilities without the difficulties encountered with the prior TDB teachings.

One aspect of the present invention concerns a mechanism for transforming a first type of instruction into a transformed instruction where the transformed instruction has increased capabilities as compared to the first type instruction. An instruction register receives a sequence of instructions beginning with a transform and load instruction, followed by a transform element containing extension bits, and followed by an instruction to be transformed. The transform extension bits are provided to be used in conjunction with the instruction to be transformed to specify added capabilities. A transform unit connected to the instruction register holds the transform extension bits and combines the transform extension bits with the instruction to be transformed to create a transformed instruction. A transform storage unit stores the transformed instruction.

Additionally, by storing predecoded instructions in partially decoded form in the transform storage unit, the pipeline decode stage actions may be minimized and in some cases, it may be possible to eliminate the decode stage. Further, by using a unique loading mechanism, instructions in one format are transformed to a second format supporting the creation of super-set instructions. The use of superset instructions, stored and executed from an transformed VLIW local storage memory, provides added processor capabilities.

A more complete understanding of the present invention, as well as other features and advantages of the invention, will be apparent from the following detailed description and the accompanying drawings.

BRIEF DESCRIPTION OF THE DRAWINGS

FIG. 4 shows a pipeline table illustrating an example of 16-bit TSP pipeline stages for a decode and load VLIW instruction type in accordance with the present invention;

FIG. 5 shows a pipeline table illustrating an example of 16-bit TSP pipeline stages for seven different instruction types in accordance with the present invention;

FIG. 8A illustrates examples of instruction formats for load transformed VLIW (LTV) instruction types, LTV1 and LTV2, supporting multiple different transformation to super-set instruction methods for loading super-set instructions from the standard instruction flow in accordance with the present invention;

FIG. 8B provides a brief operational description table for the two instruction formats LTV1 and LTV2 of FIG. 8A;

FIG. 8C illustrates an example of a single transform element for specifying transform functions for up to five slot instructions for use with an LTV1 type instruction in accordance with the present invention;

FIG. 9A illustrates a type-x arithmetic instruction format which may be suitably used as the instruction format for arithmetic logic unit (ALU) instructions, multiply accumulate unit (MAU) instructions, and data select unit (DSU) instructions in accordance with the present invention;

FIG. 9B illustrates a type-x ALU instruction in a store, load, ALU, MAU, DSU (SLAMD) VLIW as loaded in a VLIW memory (VIM) and processor without transformation capabilities;

FIG. 9C illustrates two ALU slots in adjacent TVIM locations where one of the two ALU slots contains a type-x ALU instruction and the other slot contains a super-set ALU instruction in accordance with the present invention;

FIG. 10 illustrates loading sequence pipeline table for transforming and loading five super-set instructions into a TVIM as specified by a LTV1 instruction type in accordance with the present invention;

FIG. 11A illustrates three examples of 64-bit instruction formats each made up of two 32-bit word pairs for use with an LTV2 type instruction in accordance with the present invention;

FIG. 11B illustrates an example of a 64-bit compare immediate instruction formatted in two 32-bit word pairs for use with an LTV2 type instruction in accordance with the present invention; and FIG. 12 illustrates an example of an LTV2 loading sequence pipeline table to load five 64-bit transformed instructions into a TVIM in accordance with the present invention.

DETAILED DESCRIPTION

Figure 1:
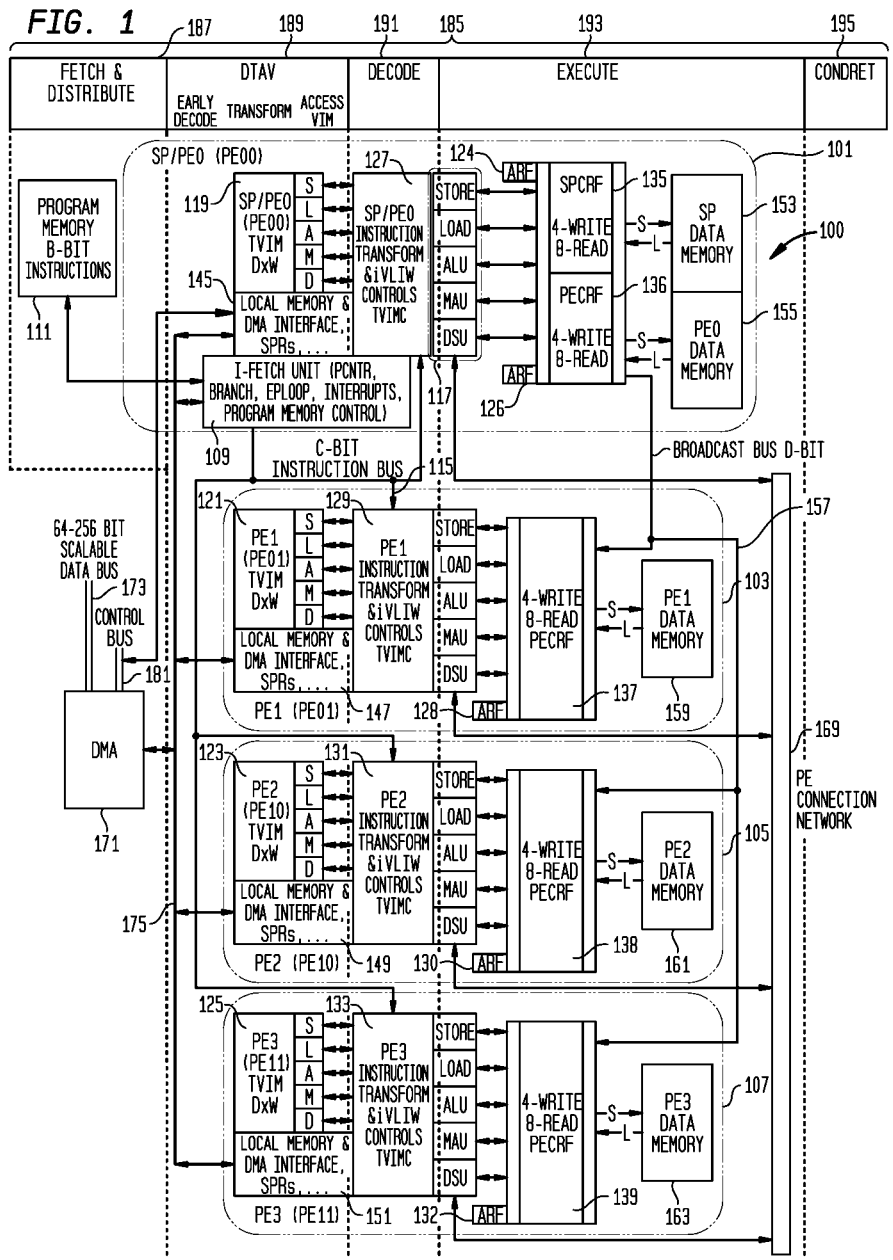
FIG. 1 illustrates a transform signal processor (TSP) in accordance with the present invention.

In a presently preferred embodiment of the present invention, a transform signal processor (TSP) 100 shown in FIG. 1 is a 2×2 indirect VLIW (iVLIW) single instruction multiple data stream (SIMD) processor. The TSP processor 100 comprises a sequence processor (SP) controller combined with a processing element-0 (PE0) SP/PE0 101. Three additional PEs 103, 105, and 107, are also utilized in conjunction with SP/PE0 101 to demonstrate improved processor capabilities by transforming instructions into a super-set form, storing transformed instructions in a VLIW memory for program selection, and executing super-set VLIWs in accordance with the present invention. It is noted that the PEs can also be labeled with their matrix positions as shown in parentheses for SP/PE0 (PE00) 101, PE1 (PE01) 103, PE2 (PE10) 105, and PE3 (PE11) 107. The SP/PE0 101 contains a fetch controller 109 to allow the fetching of short instruction words (SIWs) from a B-bit instruction memory 111, where B can be 16-bits, 32-bits, or another bit-length associated with SIW formats defined in the instruction set architecture. The fetch controller 109 provides the typical functions needed in a programmable processor such as a program counter (PCntr), branch capability, event point (EP) loop operations, and support for interrupts. It also provides the instruction memory control which could include an instruction cache if needed by an application. In addition, the SIW I-Fetch controller 109 dispatches B-bit SIWs to the other PEs in the system by means of the C-bit instruction bus 115.

In this illustrative system, common elements are used throughout to simplify the explanation, though actual implementations are not limited to the elements shown. For example, the slot specific decode and VLIW execution units 117 in the combined SP/PE0 101 can be separated into a set of decode and execution units optimized for control functions, such as typically requiring fixed point execution units. Also, PE0, as well as the other PEs, can be optimized for a floating point application. For the purposes of this description, it is assumed that the decode and VLIW execution units 117 are of the same type in the SP/PE0 and the other PEs.

SP/PE0 and the other PEs use a five instruction slot iVLIW architecture which contains transformed very long instruction word memories (TVIMs) 119, 121, 123, and 125 and transform and TVIM controller units (TVIMCs) 127, 129, 131, and 133, respectively. The TVIMs contain transformed instructions as described in detail below. The TVIMCs receive instructions as dispatched from the SP/PE0's I-Fetch unit 109 over instruction bus 115 and generate TVIM addresses and control signals required to access the transformed VLIWs (TVLIWs) stored in the local TVIMs. Referenced instruction slots are identified by the letters SLAMD in TVIMs 119, 121, 123, and 125, where the letters are matched up with instruction types as follows: store unit (SU) or (S), load unit (LU) or (L), arithmetic logic unit (ALU) or (A), multiply accumulate unit (MAU) or (M), and data select unit (DSU) or (D). When a TVLIW has been selected for execution, the slot instructions in transformed form are generally decoded and executed in the appropriate slot execution unit.

The SP and PE processor elements each contain a primary set of register files. The primary set of register files is comprised of the compute register file (CRF), the address register file (ARF), and the miscellaneous register file (MRF). The compute register files 135-139, contained in the SP/PE0 and the other PEs are a common design. Each CRF can be configured, for example, as an 8×128-bit, a 16×64-bit or a 32×32-bit register file on a cycle-by-cycle basis. Other register file configurations and capacities are not precluded and depend upon the instruction set architecture of the processor. Compute register files serve as the data sources or destinations for ALU, MAU, and DSU instructions and can also be accessed via the LU and the SU.

Each of the five ARFs 124, 126, 128, 130, and 132 shown in the TSP processor 100, is, for example, configured as an 8×32-bit register file. Address registers contain address pointers used by the LU and the SU to address memory and the ARF registers can also be accessed via the DSU.

Each MRF in the SP and PEs may suitably be configured as a 24×32-hit register file. Miscellaneous registers include registers to retain the higher-order bytes from a multiply-extended-accumulate (MPXA) operation, registers that store condition information, registers for interrupt control and processing, or the like. The MRF individual registers are many times distributed within a processor, but can generally be considered to be part of the local memory and direct memory access (DMA) interface logic 145, 147, 149, and 151, closely associated with the TVMIC 127, 129, 131, and 133, the VLIW execution units, and the Ifetch unit 109 in the SP/PE0 101.

Due to the combined nature of the SP/PE0 101, the SP/PE0 local memory and data bus interface logic 145 handles the data processing needs for accessing data in SP data memory 153, and data in PE0 data memory 155. The other PEs 103, 105, and 107 contain physical data memory units 159, 161, and 163, respectively, that have a common design. The SP/PE0 local memory and data bus interface logic 145 also is the controlling point of the data that is sent over a D-bit broadcast data bus 157. The D-bit broadcast data bus size may be 32-bit, 64-bit, 128-bit, or other size depending upon the instruction set architecture. In typical SIMD processing, the data stored in the PE data memories is generally different as required by the local processing done on each PE. The interfaces to these PE data memories have a common design in PE1 103, PE2 105, and PE3 107 using local memory and DMA interface logic 147, 149 and 151, respectively. In addition to the primary set of register files, the SP and PEs also contain special purpose registers (SPRs), located, for example, in the local memory and DMA interface logic 145, 147, 149, and 151. SPRs include system configuration registers, event point registers, as well as any system specific or application specific registers.

Interconnecting the PEs for data transfer communications is a PE connection network 169 that supports DSU communication instructions to move data between PEs in an arrangement of multiple PEs.

The interface to a host processor, other peripheral devices, and external memory can be implemented in many ways. For completeness, a primary interface mechanism is contained in a direct memory access (DMA) control unit 171 that provides a scalable data bus 173 that connects to devices and interface units external to the TSP core. The scalable data bus 173 supports, for example, 64-256 bit bus configurations. The DMA control unit 171 provides the data flow and bus arbitration mechanisms needed for external devices to interface to the SP and local processor element memories via the multiplexed bus interface 175. A control bus (CB) 181 is also shown in FIG. 1.

The TSP 100 uses a short fixed pipeline which consists of a fetch stage 187, an early decode, transform and access VIM stage (DTAV) 189, a decode stage 191, an execute stage 193, and a condition return stage (CondRet) 195. The execute stage 193 may be made up of an execute-1 stage (Ex1) and an execute-2 stage (Ex2) if necessary depending upon the instruction type in execution. Fetch stage 187 retrieves SIWs from program memory 111. When an indirect VLIW SIW is to be executed, the pipeline uses the DTAV pipeline stage, after the fetch stage, for accessing a VLIW from local VLIW memory, as is described further below. The DTAV pipeline stage 189 is also used to transform SIWs prior to loading them into the VIM.

Figure 2:
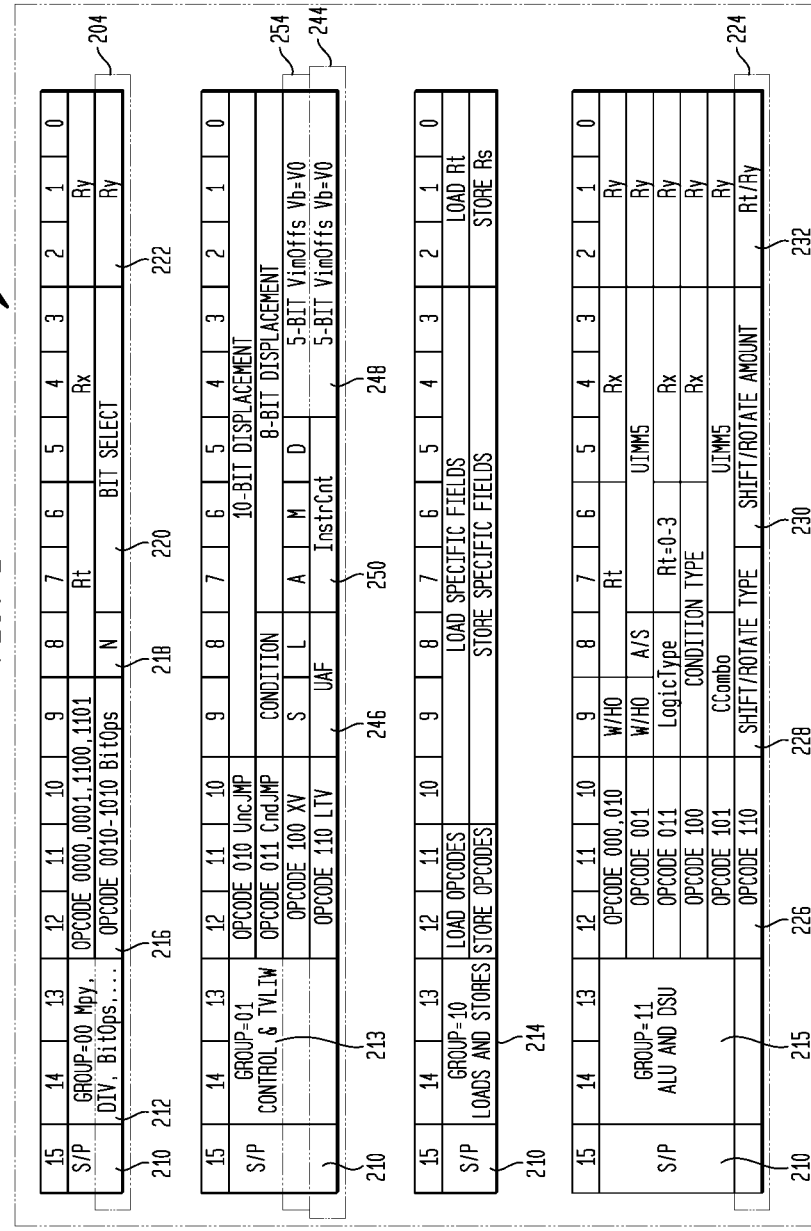
FIG. 2 illustrates several examples of 16-bit short instruction word (SIW) formats suitably for use in a 16-bit TSP in accordance with the present invention.

FIG. 2 illustrates several examples of 16-bit short instruction word (SIW) formats 200 suitably for use in a 16-bit TSP, such as TSP 100. A program made up of B=16-bit SIWs is stored in program memory 111. The 16-bit TSP SIW formats 200 are referred to as type-j instructions. The type-j 16-bit instructions and opcodes of FIG. 2 are similar to the dynamic compact 15-bit instructions described in U.S. Pat. No. 6,101,592. The S/P bit 210 is an additional bit across all type-j instructions as compared to the 15-bit dynamic compact instructions. The S/P bit 210 specifies instructions to be either SP or PE instructions allowing the 16-bit instructions of FIG. 2 to be generally used on both the SP/PE0 and the other PEs. In addition, the TSP 100 uses a 5-slot VLIW architecture where each VLIW slot is for a transformed 16-bit instruction, as described further below.

It is noted that one aspect related to the storing of transformed instructions that are partially decoded or fully decoded instructions in a VLIW is that the stored VLIW instruction now is a transformed form of the original instruction that was stored in the program memory. The transformation is from an encoded assembly level format to a partial or full binary machine level format. The transformation mechanism is invoked by the load transformed VLIW (LTV) instruction which causes an instruction retrieved from program memory to be transformed into a new language format and then stored in a TVLIW in the TVIM. An XV then accesses the transformed instructions in the TVLIW for execution. Other transformation options are discussed below.

Another aspect related to the storing of transformed instructions in a VLIW is that the width of the instructions stored in the VLIW is not tied to the width of the instructions stored in the program memory. Rather, in the case of storing partially decoded or decoded instructions, the width and decoded instruction format can be tied to the implementation as a mechanisms for improving critical path timing and therefore improving path time balancing in the pipeline. An important concept here is that the format of a transformed instruction is optimized to the implementation requirements that may include other needs beyond timing path improvement. Such improvements can include increased functionality and improvements to instruction level parallelism.

Prior to transformation for storage in the TVIMs, the SIW formats 200 are in assembly format. Four major instruction groupings are illustrated in FIG. 2 with each group identified by its group field 212, 213, 214, or 215, respectively. The first group field 212 identifies multiply, divide, and bit operation instruction types. The second group field 213 identifies control and TVLIW instruction types. The third group field 214 identifies load and store instruction types, and the fourth group field 215 identifies ALU and DSU instruction types.

For the present TSP example, the transformation operation is a decoding operation on selected bit fields with each group of instruction types having one or more variations. For example, a bit operation (bitop) instruction type 204 can be predecoded as shown in predecode Table 1.

Predecode TABLE 1

| BitOp Instruction 204 | | Predecode Bits | |
| --- | --- | --- | --- |
| Bit Field | #Bits | Decode? | #Bits |
| S/P-bit 210 | 1 | No | 1 |
| Group Field 212 | 2 | Yes | 4 |
| Opcode 216 | 4 | Yes | 16 |
| Negate 218 | 1 | No | 1 |
| Bit Select 220 | 5 | Yes | 32 |
| Ry 222 | 3 | No | 3 |
| Total | 16 | Total | 57 |

Predecode Table 1 shows that for the 16-bit bitop instruction 204 there are a total of 57-bits in the partially decoded form of the bitop instruction.

In another example, a shift instruction 224 can be transformed as shown in predecode Table 2.

Predecode TABLE 2

| Shift Instruction 224 | | Predecode Bits | |
| --- | --- | --- | --- |
| Bit Field | #Bits | Decode? | #Bits |
| S/P-bit 210 | 1 | No | 1 |
| Group Field 215 | 2 | Yes | 4 |
| Opcode 226 | 3 | Yes | 8 |
| Shift/Rotate Type 228 | 3 | Yes | 8 |
| Shift/Rotate Amount 230 | 4 | Yes | 16 |
| Rt/Ry 232 | 3 | No | 3 |
| Total | 16 | Total | 40 |

Predecode Table 2 shows that for the 16-bit shift instruction 224 there are a total of 40-bits in the partially decoded form of the shift instruction. Due to variations in the formats of different instructions, the partially decoded formats are also of varying bit widths. In a TVIM with dedicated slots, such as the TSP 100 uses, having variable bit width slots can provide a more optimal use of the TVIM memory space than having fixed width slots. The variable width slot format is supported by having a portion of a slot's format be of fixed size using fixed bit positions for all instructions within that VLIW slot location, the other bits in the slot's instruction formats can vary, allowing slot instructions to advantageously be of variable width. For example, by guaranteeing the first five bits of a decoded instruction, obtained by using the S/P-bit 210 as a first bit and group 2-bits 212-215 decoded into 4-bits as the second through fifth bits, for all decoded instructions stored in each VLIW slot, then each slot can store a variable number of other SIW format bits for each group 212-215. This decoding approach can further be defined in a hierarchical fashion, such that a bit field, following the 5-bit S/P and decode group field, can be an opcode field such as illustrated in FIG. 2, where different opcodes can further specify different formats for the other bits in the decoded instruction.

Figure 3:
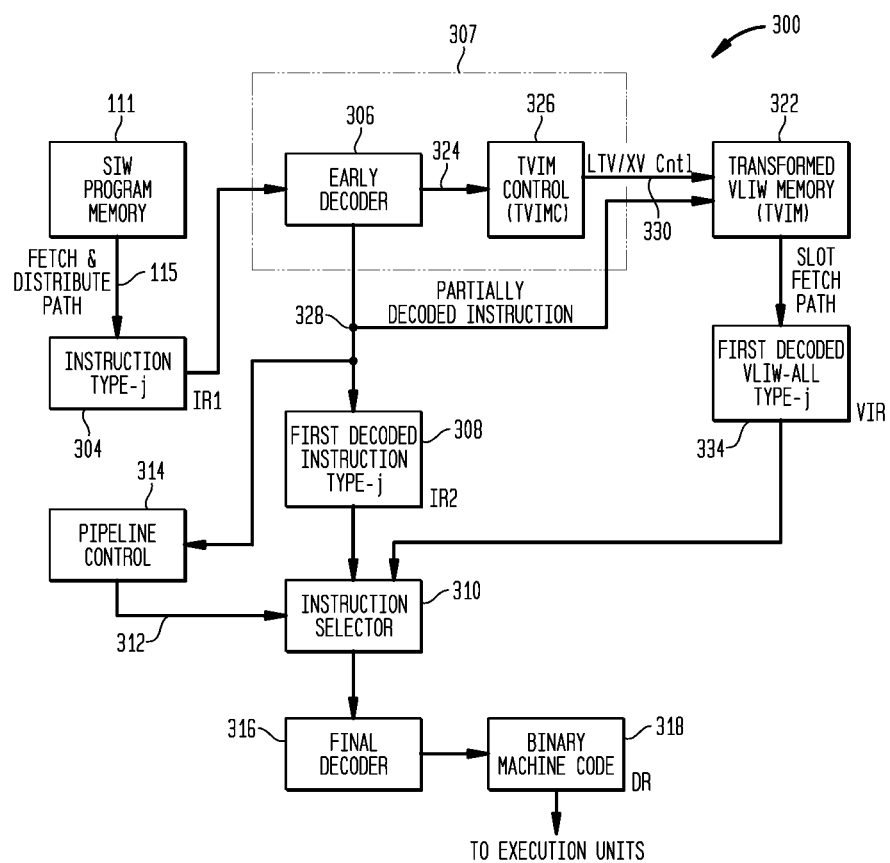
FIG. 3 illustrates an example of a 16-bit TSP instruction flow showing data flow paths an instruction travels to a transformed VLIW memory (TVIM) and data flow paths supporting the generation of an instruction in binary machine executable form in accordance with the present invention.

FIG. 3 illustrates an example of a 16-bit TSP instruction flow 300 showing data flow paths an instruction travels to a transformed VLIW memory (TVIM) 322 and data flow paths supporting the generation of an instruction in binary machine executable form. The exemplary TSP instruction flow 300 of FIG. 3 is illustrative of non-branch type instruction pipeline operations in the SP/PE0 101 and in each PE 103, 105, and 107 in accordance with the present invention. A two-step decoding transform process is used to conserve TVIM space and balance decode timing paths in the processor. In a first decode step, an instruction, when issued by itself and not as part of a VLIW, such as instruction 204 of FIG. 2, would have a subset of bits of the instruction decoded in early decoder 306. For example, the early decoding of instruction 204 as follows: the 2-bits of group 212 decode to 4-bits, the 4-bits of opcode 216 decode to 16-bits, for a total of 20 decoded bits. Since bit 15, S/P-bit 210 and the Negate N 218 are single bits, further decoding is not necessary. In the first decode step, the 5-bit bit-select field 220 and the 3-bit Ry field 222 are not decoded. A second decode stage described below decodes the 5-bit bit-select field to 32-bits, after the VLIW instruction slot is retrieved from the TVIM. The Ry 222 3-bits are decoded in the register file subsystem during the execute stage.

The TSP instruction flow 300 contains SIW program memory 111, a fetch and distribute path 115, an instruction register 1 (IR1) 304 for receiving a fetched instruction, and a transform and TVIM controller 307. A fetched SIW stored in IR1 304 is decoded in an early decoder 306 providing decode signals 324 to a TVIM controller 326 and a partially decoded instruction 328 to be used in loading transformed instructions in the TVIM 322, stored as a first decoded instruction in instruction register 2 (IR2) 308, and used in pipeline control 314.

In operation, if a transformed VLIW is accessed from the TVIM 322, it is stored in a first decoded VLIW instruction register (VIR) 334. Depending upon whether an SIW is to be executed or a transformed VLIW is to be executed, pipeline control 314 selects the first decoded instruction 308 or the first decoded VLIW instruction 334 by sending a selection signal 312 to instruction selector 310. The selected instruction or instructions are decoded in a final decoder 316 and the decoded results stored in binary machine code decode register (DR) 318 which provides input to execution units.

FIG. 4 shows a pipeline table 400 illustrating an example of 16-bit TSP pipeline stages for a decode and load VLIW instruction type. The decode and load VLIW instruction type loads transformed SIWs into the TVIM 322 to create a transformed VLIW as initiated by a load TVIM (LTV)

instruction. FIG. 5 shows a pipeline table 500 illustrating an example of 16-bit TSP pipeline stages for seven different instruction types. Both FIGS. 4 and 5 are discussed below in conjunction with the TSP instruction flow 300 to further illustrate basic TSP operation in accordance with the present invention.

TSP 100 will now be discussed in further detail with regard to TSP instruction flow 300 using the program memory 111 for storing programs. The programs stored in program memory 111 consist of SIWs having an instruction format of B=16-bits, so that all SIWs are 16-bits and referenced as types. It is noted that not all instructions may be transformed, such as control and iVLIW group 01 213 instructions, as these instructions are not stored in a VLIW as specified in the TSP architecture. The pipeline table 400 illustrates a pipeline sequence followed when a load transformed VLIW (LTV) instruction 244 is received for execution. The LTV instruction 244 is utilized for loading multiple instruction slots, for example, five instruction slots, using the TSP processor 100 and TSP instruction flow 300. The pipeline table 400 includes a processor clock cycles column 402 beginning the LTV pipeline at fetch LTV and distribute LTV stage 404, similar to fetch and distribute stage 187 of FIG. 1, corresponding to cycle T.

An LTV instruction 244 causes the loading of transformed VLIWs into the transformed (TVIM) memories such as TVIMs 119, 121, 123, 125, and 322. In FIG. 3, a PE LTV SIW 244 is fetched from a program memory, such as program memory 111, based on a fetch controller 109 PCntr derived program address. The fetched PE LTV is distributed over instruction bus path 115 to the SP/PE0 101 and the other three PEs 103, 105, and 107 during a fetch and distribute cycle, such as fetch stage 187 or 404. At the end of the fetch and distribute stage 404, the fetched PE LTV is latched into an instruction register 1 (IR1) in the SP/PE0 101 and in each PE 103, 105, and 107, such as IR1 304. In the next pipeline stage 408, the PE LTV is decoded in early decoder 306 in the transform and TVIM controller 307 in each PE. The fetched PE LTV instruction is recognized in the early part of decode, transform, access-VIM (DTAV) stage 408 in the early decoder 306 and the instruction decode information is sent via decode signals 324 to the TVIM memory controller (TVIMC) 326 of each respective PE. The partially decoded instruction 328 is sent to the pipeline control 314. A TVIM address is generated in the TVMC 326 using the 5-bit VimOffs 248 with TVIM base address register Vb set to initial register V0. A loadTVIM mode is set up along with the TVIM address during DTAV T+1 stage 408 while the fetch controller is fetching from program memory 111 the first slot instruction to be loaded. The PE LTV sequence is controlled by the TVIMC 326 and pipeline control 314 to load the PE LTV specified number, instrent 250, of transformed instructions into enabled TVIM slots.

Each instruction, of the specified group of instructions, directly following the PE LTV is first transformed by decoding in the early decoder 306, then the transformed partially decoded instruction 328, is loaded into the correct slot position in the TVIM. The slot position is determined through a decode of the group, such as group 212, and opcode fields, such as opcode 216. The PE LTV and XV TVIM accessing control signals LTV/XV cntl 330 are provided by the TVIMC 326. The first slot instruction latched into IR1 304 during the T+1 cycle 408 is now transformed in early decoder 306 and then loaded into the TVIM in T+2 cycle 412. Also, during cycle 412, a second slot instruction is fetched and latched into IR1.

This operation continues for the next four instructions to be loaded into the TVIM during cycles 416, 420, 424, and 428. The unit affecting field (UAF) 246 is also loaded into the TVIM at the specified TVIM address during the loading of a slot instruction, such as the loading of the first slot instruction in cycle 412. The CAF 246 is used to specify which execution unit of the enabled VLIW slots is to affect the condition nags. Transformed instructions loaded into TVIM slots by an SP/PE LTV instruction are all treated as enabled instructions with the enabling of execution controlled by an XV instruction. Note that PEs may be in an enabled or disabled state and only enabled PEs receiving a PE LTV instruction will load the specified instructions into their local TVIMs in parallel.

FIG. 5 shows a pipeline table 500 illustrating an example of 16 dbit TSP pipeline stages for seven different instruction types. For SIWs 504, which are executed singly and not as part of a VLIW, the pipeline begins with a fetch and distribute stage 508. After a non VLIW instruction has been fetched and latched into an instruction register (IR1), it is decoded in the second pipe stage, such as DTAV stage 189 or 512. The DTAV stage comprises the IR1 instruction being decoded in a first decoder, early decoder 306, and the partially decoded instruction 328 latched in IR2 308. In the next pipeline stage, such as decode stage 191 or 516, for non VLIW instructions, the partially decoded instruction 328 stored in IR2 308 is selected to pass through the instruction selector 310 by the control signal 312 generated by pipeline control 314. The output of the instruction selector 310 connects the partially decoded instruction to the final decoder 316 for final decoding and the final decoded results are latched in binary machine code decode register (DR) 318. Additional operations may occur during the decode pipeline stage dependent upon the instruction type. For example, store and load instructions, 518 and 520 respectively, may access operands in the address register file (ARF) or compute register file (CRF) and generate a local data memory address. The next pipeline stage, such as execute stage 193 or 524 for single cycle execute instructions such as load 520, load broadcast 526, and 1-cycle execute instructions 528, executes the decoded instruction and writes the results to a compute register file local to the processing element. A number of instructions may require two cycles to execute and a second execute pipeline stage 532 is provided in support of those instructions. A first condition return stage 532 completes the execution operation of a 1-cycle execute instruction and a second condition return stage 536 completes the execution operation of a 2-cycle execute instruction. A 1-cycle execute instruction's condition return stage 532 may overlap with the second execute pipeline stage 532 of a 2-cycle execute instruction. The condition return stage is used to register any flags resulting from the execute operation as specified by the architecture.

When at least one VLIW is loaded into the TVIM, it can be accessed by an XV instruction. A 16-bit XV 254 or 540 fetched from program memory 111, is distributed and latched in IR1 304, at the end of the fetch and distribute cycle 508. The XV is first decoded in early decoder 306 causing the TVIM 322 to be accessed in DTAV stage 512. The transformed VLIW that is fetched contains instructions that have been partially decoded by the early decoder 306. The partially decoded VLIW instructions are latched in VLIW instruction register (VIR) 334. The XV selected VLIW instruction is passed through the instruction selector 310 as selected by the control signal 312 generated by pipeline control 314. For each enabled instruction in the VLIW, final decoding is done in the final decoder for each slot with the results latched in the decode register 318. Pipeline stages for each instruction in a VLIW are illustrated by stages 516, 524, 532, and 536.

Depending on what types of instructions are stored in TVIM, the decode stage may indicate a 1-cycle or a 2-cycle execute SIW. For example, in FIG. 5, the decode pipe stage 542 is for 1-cycle execute SIWs with an execute sequence 544 and the decode pipe stage 543 is for 2-cycle execute SIWs with an execute sequence 546. The decode pipe stages 542 and 543, for example, are totally devoted to the second decoding step for the fetched VLIW 1-cycle and 2-cycle execute SIWs. If these SIWs 544 and 546 were stored in fully decoded form in the TVIM then the pipe stages 542 and 543 could be removed for those 1-cycle and 2-cycle execute SIWs.

It is noted that there are many instruction set architectures which are restricted to a specific instruction width even when improvements to their architectures are contemplated. By use of local VLIW memories and the techniques of the present invention as described further below, it is feasible to extend these architectures by use of instruction widths beyond the original instruction set definitions. For purposes of illustration, a specific 32-bit instruction set architecture is used to describe how 32-bit instructions can be transformed into super-set instructions. An appropriate 32-bit architecture is discussed in detail in U.S. Pat. No. 6,748,517 and referenced herein as the Mprocessor. To obtain super-set instruction capabilities, a new type of transformation technique is presented that obtains increased functionality and improvements in instruction level parallelism. This transformation technique presents a super-set instruction architecture where the instructions stored in a VLIW memory use 32-bit instruction formats, such as used in the Mprocessor, of which examples of instruction formats are described herein, or use super-set instruction formats that are greater than the presented 32-bit instruction examples.

One of the typical underlying principles used when developing an improved processor architecture is to support existing legacy code and existing code development tools. Using this rationale, it is assumed desirable to support the Mprocessor architecture, including the basic approach of loading a VLIW from the program memory stream as used in the Mprocessor with load VLIW (LV) instructions. The super-set transformation technique then extends an Mprocessor type load VLIW capability with minimum impact to a programmers view of the load VLIW operations. Consequently, two types of load VLIW instructions are described for the purposes of transforming instructions of SIW formats stored in program memory into super-set instructions, loading them into a transformed VLIW memory, and supporting multiple types of super-set instruction formats in a VLIW.

Figure 6:
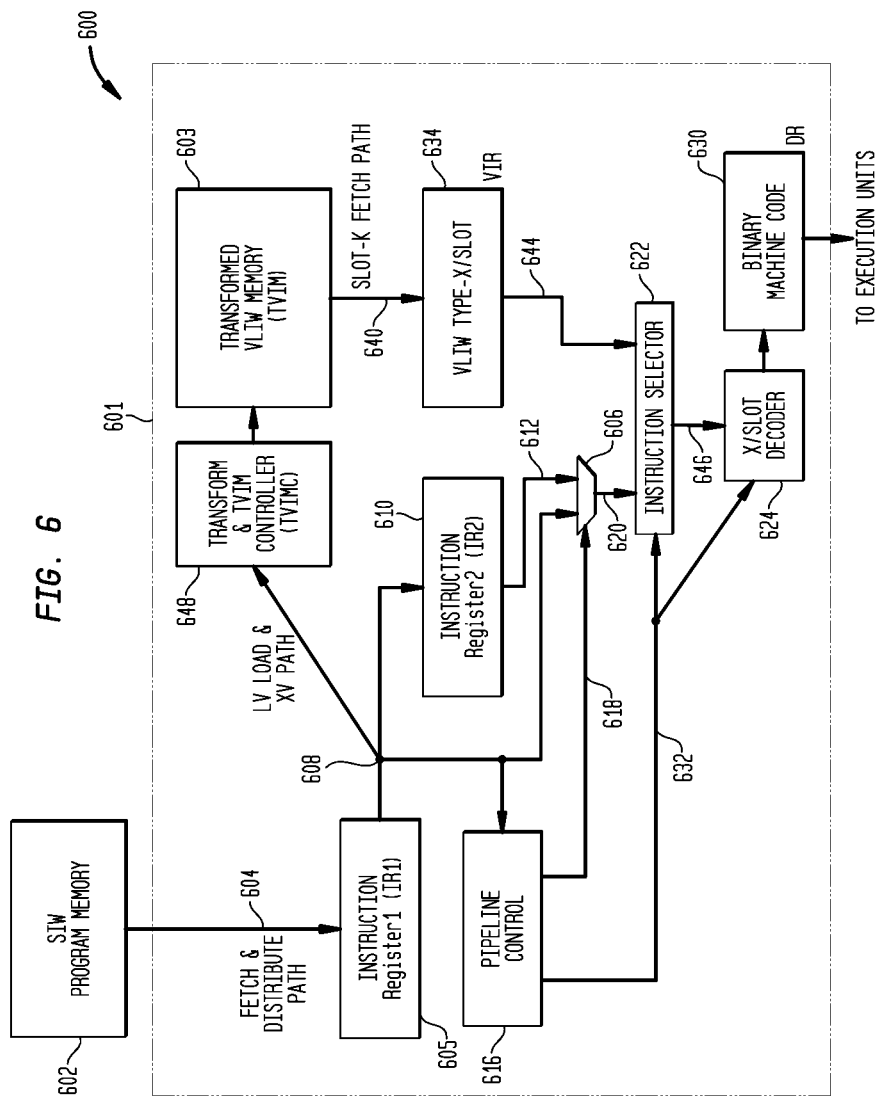
FIG. 6 illustrates an example of a logical instruction flow for a super-set TSP showing SIW and VLIW paths to transformed VLIW memory (TVIM) and for generating an instruction in binary machine executable form in accordance with the present invention.

FIG. 6 illustrates an example of a logical instruction flow 600 for a super-set TSP showing SIW and VLIW paths to transformed VLIW memory (TVIM) and for generating an instruction in binary machine executable form. The logical instruction flow 600 is split into an instruction transform (itransform) flow 601 and a source of instructions distributed from a SIW program memory 602. In an array processor, similar to TSP 100, the itransform flow 601 is representative of the SIW and VLIW flow in each attached PE including, at a high level, the SP/PE0, if a merged SP and PE is utilized. The logical instruction flow 600 supports multiple instruction widths and formats, including support for Mprocessor 32-bit instructions, referenced as type-x instructions, and instructions that are a super-set of the type-x instructions. All SIWs, including each load VLIW instruction and its associated sequence of instructions, are of the same 32-bit width and stored in the SIW program memory 602. The type-x SIWs are all of 32-bits, though the advantageous super-set principles described herein apply equally well to other instruction formats, such as the type-j 16 dbit formats 200 of FIG. 2.

Additionally, various other instruction formats supported by the super-set TSP for storage in a transformed VIM (TVIM) are presented that utilize an instruction width different than the SIW format. For example, 28-bit, 33-bit, and 64-bit instruction examples are presented as type-a, type-b, and type-c slot specific instructions, respectively, that can be stored in the TVIM, such as TVIM 603. The super-set instructions are created using a load transformed VLIW (LTV) sequence of multiple instruction elements including, for example, transform extension bits and instructions. The transform extension bits and instructions are transformed in transform units to create the super-set instructions that may then be loaded into the TVIM 603.

All SIWs, including all instruction elements that make up a load VLIW sequence of instructions, are fetched from SIW program memory 602, distributed over fetch and distribute path 604 and latched in an IR1, such as IR1 605. Single type-x SIWs can still flow, as selected by multiplexer 606 in a normal pipe sequence, by selecting an SIW from IR1 605 over path 608, or in an expanded pipe sequence, by selecting an SIW from IR2 610 over path 612. Pipeline control 616 provides multiplexer selection signal 618 based on a pipeline state machine operating in pipeline control 616. Output 620 of multiplexer 606 passes through the instruction selector 622 to an x/slot decoder 624. The x/slot decoder output is a binary machine code that is latched in decode register (DR) 630. The x/slot decoder 624 receives instruction selection signals 632 to determine whether a single type-x instruction is being decoded or a VLIW of varying instruction types and formats is being decoded.

A single type-x instruction is being decoded when the instruction selector 622 selects the output 620 from multiplexer 606. A VLIW of varying instruction types and formats is being decoded if the instruction selector 622 selects the VLIW path 644 from the VIR 634. It is noted that a VLIW slot instruction, as described by the present invention, may advantageously be either a type-x 32-bit instruction or a super-set instruction of a different size and format, such as the type-b and type-c formats, for example. When an XV SIW is executed, a VLIW is selected from the TVIM 603, made available on the TVIM output 640 and loaded into the VIR 634. For each VLIW slot instruction received in the VIR 634, there is an additional descriptor bit or bits that accompany the slot instruction to specify the size and format of the slot instruction. Output 644 of the VIR 634 provides the selected VLIW to the instruction selector 622. When the output 644 is selected the instruction selector provides the VLIW to its output 646. The x/slot decoder 624 receives the slot instructions including the descriptor bit or bits such that the appropriate decode action may occur on each slot instruction. Consequently, a VLIW may be made up of all type-x instructions, a mix of type-x instructions and super-set instructions, or all super-set instructions.

In order to transform and load instructions into a VLIW in a TVIM 603, a load VLIW SIW is fetched from SIW program memory 602, distributed over fetch and distribute path 604 to array elements and latched into a local instruction register (IR1), such as IR1 605. From there, a load transformed VLIW sequence is initiated that directs a processing element to receive the sequence of instruction elements, including instructions to be transformed, transforms them appropriately by the transform and TVIM controller (TVMIC) 648 and loads the transformed instructions into a selected VLIW address in the TVIM 603.

Figure 7:
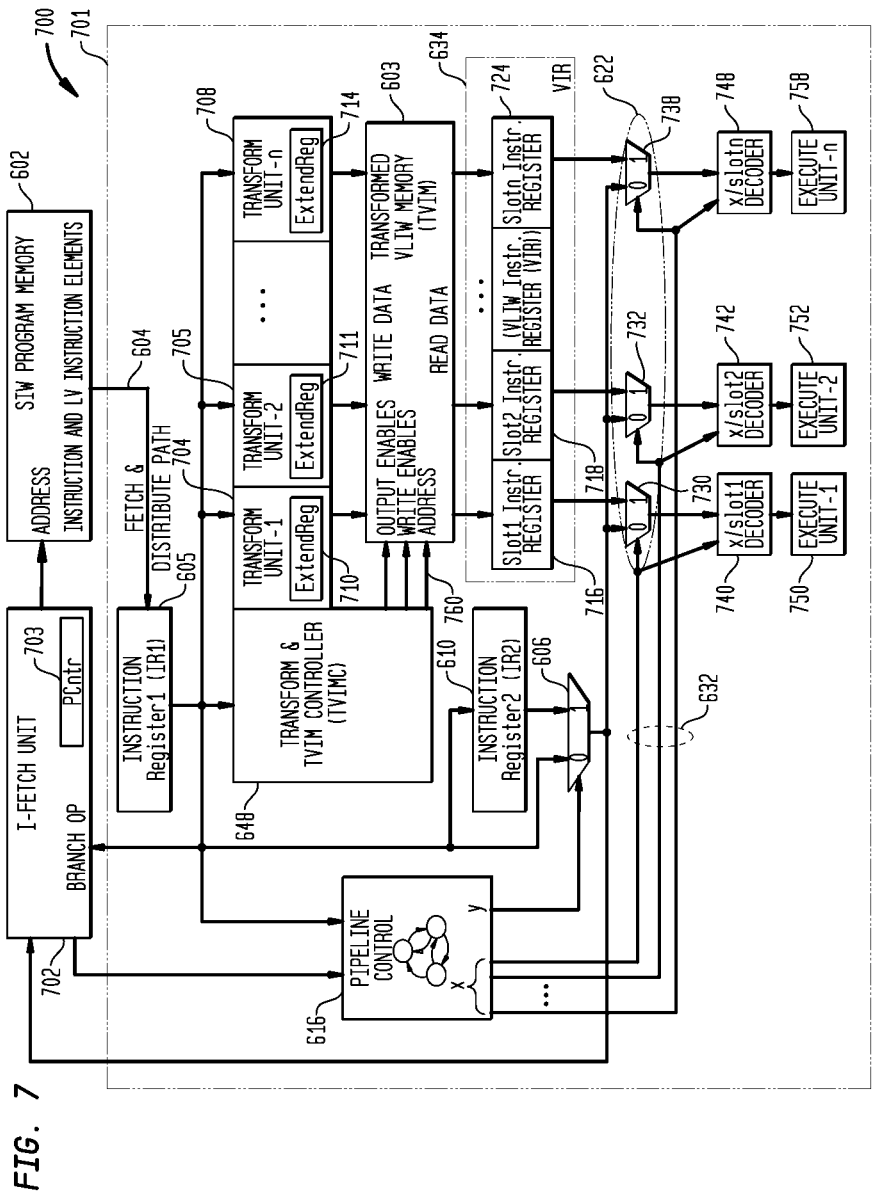
FIG. 7 illustrates a logical VLIW flow as used in an example super-set TSP showing the pipeline sequencer controls and paths to the execution units in accordance with the present invention.

FIG. 7 illustrates a logical VLIW flow 700 as used in an example super-set TSP. Flow 700 shows the pipeline sequencer controls and paths to the execution units in further detail. The logical VLIW flow 700 is split into a VLIW transform flow 701 supporting up to n slots in a VLIW and a source of instructions distributed from a SIW program memory 602. In an array processor, similar to TSP 100, the VLIW transform flow 701 is representative of the SIW and VLIW flow in each attached PE including, at a high level, the SP/PE0, if a merged SP and PE is utilized. An 1-fetch unit 702 indicates the use of a program counter (PCntr) 703 for use in generating addresses for the SIW program memory 602 as would typically be found in a control processor, such as the f-fetch unit 109 of the merged SP/PE0 101.

The VLIW transform flow 701 illustrates that each instruction slot in a VLIW is supported by its own transform unit 704, 705, through transform unit-n 708, located in the transform and TVIM controller (TVIMC) 648 for transforming instructions using instruction elements into super-set instructions and for loading type-x instructions otherwise. Each transform unit includes instruction element storage for storing transform extension bits, for example. The instruction slots in a VLIW selected for execution are latched in their associated slot registers 716, 718, through slot-n instruction register 724 of the local VIR 634. Associated with each selected slot instruction is a path through the instruction selector 622. The instruction selector 622 consists of multiplexers 730, 732, through multiplexer 738 enabled to select individual slot instructions from the VIR 634 by instruction selection signals 632. A selected slot instruction proceeds to its associated x/slot# decoder, such as x/slot1 decoder 740, x/slot2 decoder 742, through x/slotn decoder 748. Based on the descriptor bit or bits that accompany the selected slot instruction, the x/slot# decoders 740-748 appropriately decode the instruction to binary machine code form for execution on the associated execution unit 750, 752, through 758, respectively.

It is noted that the 1-fetch unit 702 uses PCntr 703 for SIW program memory 602 instruction selection and also provides sequential address generation for the load VLIW sequence of program stored instruction elements that are transformed in the TVMIC 648 transform units 704, 706, through transform unit-n 712.

FIG. 8A illustrates exemplary instruction formats for load transformed VLIW (LTV) instruction types, LTV1 804 and LTV2 808, supporting multiple different transformation to super-set instruction methods for loading transformed super-set instructions from the standard SIW flow source SIW program memory. The LTVs, LTV1 804 and LTV2 808, use different opcodes 806 to differentiate their operating functions. Further, depending on implementation needs, one or both instruction types LTV1 and LTV2 may be implemented in a processor.

FIG. 8B provides a brief operational description table 825 for the two instructions LTV1 804 and LTV2 808 of FIG. 8A. As described in LTV1 instruction description 826, the LTV1 instruction is interpreted by the hardware to indicate that only one transform element immediately follows the LTV1 instruction which is then followed by a fixed number of instructions specified by InstrCnt 810. In other words, the number of instructions that follow the transform element 835 is specified by the InstrCnt bit field 810, where such number may be tied to the number of slots in a VLIW of a particular implementation. For example, TSP 100 has five SLAMD instruction slots in TVIMs 119, 121, 123, and 125. Further, FIG. 5C illustrates an example of a single transform element 835 containing transform extension bits for use with an LTV1 type instruction for SLAMD type VLIWs. A transform element, such as transform element 835, is not an instruction, but an instruction wide bit field where bits of the transform element are used in transforming instructions to super-set instructions.

As shown in FIG. 8C, the transform element contains a transform bit field 836 specifying, by simple decoding, up to eight different instruction element formats as defined in the following transform format encoding description Table-3.

| Transform bit field | Transform Format Encoding Description Table-3 |
|---|---|
| 000 | Transform element bits contain transformation bits for a Store instruction |
| 001 | Transform element bits contain transformation bits for a Load instruction |
| 010 | Transform element bits contain transformation bits for an ALU instruction |
| 011 | Transform element bits contain transformation bits for a MAU instruction |
| 100 | Transform element bits contain transformation bits for a DSU instruction |
| 101 | Transform element bits contain transformation bits for 5 slot instructions |
| 110 | Transform element bits specify transform functions for 5 slot instructions |
| 111 | Reserved |

Figure 9D:
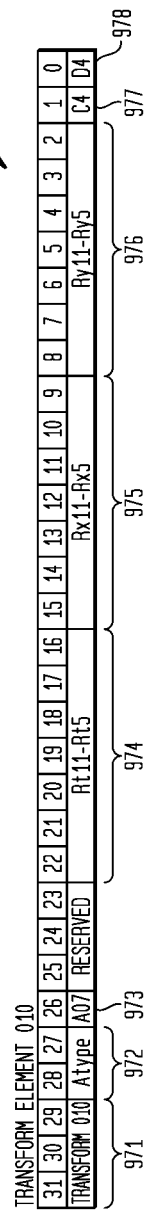
FIG. 9D illustrates an example of a single transform element for specifying transform functions for a single slot instruction for use with an LTV1 type instruction in accordance with the present invention.

In Table-3, five of the transform bit field format encodings 000-100 identify formats where all the transform element bits beyond the transform bit field 836 may be used to specify transformation of specific instructions. In other words, bits 0-28 of transform element 835 may be used to specify transformation of specific instructions. A specific example is described in further detail below in connection with FIG. 9D. For the five formats 000-100, the LTV1 instruction sequence consists of an LTV1 instruction, a transform element, followed by up to five instructions, depending upon the number of VLIW slots to be loaded, where only one instruction is specified for transformation.

One advantageous aspect of the transformation technique of the present invention is its application to previously loaded instructions in a VLIW in the TVIM. In this context, an LTV1 and transform element may be utilized to specify the transformation of one or multiple instructions in the stored VLIW, by designing the TVIM memory to support such operation as discussed further below. For example, a TVIM that supports a read-modify-write operation or selective bit write capabilities may be used for such transformation purposes. Modifying previously loaded instructions in a VLIW is specified by having the LTV1 InstrCnt 810 set to zero indicating no instructions follow the transform element. Then, a transform element's transform bit field as identified in Table 3 is used to specify how to transform an instruction or instructions in the already loaded VLIW. Being able to selectively update a previously loaded VLIW allows flexibility in managing latency associated with loading instructions into a VLIW while still supporting extended super-set instructions in an application.

FIG. 8C further illustrates one possible format for a transform element 835, which has transform bit field encoding 101 as defined in transform format encoding description Table-3. In addition to the transform bit field 836, the transform element 835 comprises five separate sets of bit fields, one set for each instruction slot in a VLIW, where the store and load instructions use a common bit field arrangement and the arithmetic instructions use a common bit field arrangement. Bit field 838 supports transforming store instruction types and includes an Stype bit field 840 defining up to four store formats for the 838 bit field. Bit field 838 further contains an instruction opcode expansion bit 842 to expand the opcode of existing type-x store instructions by an additional bit thereby doubling the number of store opcodes that can be supported. Bit field 838 also contains a source register bit 844 to expand an existing source register field by one bit, for example, transforming a 6-bit source register field to a 7-bit field. Bit field 846 supports transforming load instruction types and includes a bit field 848 defining up to four load formats for the 846 bit field. Bit field 846 further contains an instruction opcode expansion bit 850 to expand the opcode of existing type-x load instructions by an additional bit thereby doubling the number of load opcodes that can be supported. Bit field 846 also contains a target register bit 852 to expand an existing target register field by one bit, for example, transforming a 6-bit target register field to a 7-bit field. Bit field 854 supports transforming ALU instruction types and includes a bit field 856 defining up to four ALU formats for the 854 bit field. Bit field 854 further contains an instruction opcode expansion bit 858 to expand the opcode of existing type-x ALU instructions by an additional bit thereby doubling the number of ALU opcodes that can be supported. Bit field 854 further specifies a bit 860 to expand the data type field of existing type-x ALU instructions by an additional bit thereby doubling the number of packed data operations that can be supported. Bit field 854 also contains a target register bit 862, a source register bit 864 and a source register bit 866 to double the accessible register space, for example transforming a 5-bit register operand bit field in existing type-x ALU instructions to a 6-bit field. The MAU 868 and DSU 882 transform element formats are similarly defined as the ALU 854 format.

An LTV1 instruction sequence begins with the LTV1 instruction 804 followed by a single transform element, for example transform element 835, followed by InstrCnt instructions, as defined by the InstrCnt bit field 810 of the LTV1 instruction. It is noted that if not all slots are being loaded, then one encoding of the 2-bit slot transform bit field 840, 848, 856, 870 and 884, can be defined as a no modification format. It can be appreciated that numerous combinations can be supported depending upon implementation needs allowing great flexibility in architectural alternatives.

FIG. 9A illustrates a type-x arithmetic instruction format 900 which may be suitably used as the instruction format for arithmetic logic unit (ALU) instructions, multiply accumulate unit (MAC) instructions, and data select unit (DSU) instructions. The type-x arithmetic instruction format 900 includes group bit field 902 and unit bit field 904. The group bit field 902 and unit field 904 are useful for the load VLIW operation. The group bit field 902 specifies a major grouping of instruction types, such as load/store, arithmetic, control, and a reserved instruction type. The unit bit field 904 specifies ALU, MAU, DSU, and reserved instruction types. FIG. 9B illustrates a portion of a VLIW 920 where an arithmetic instruction such as an ALU instruction 922 using a subset of the basic format 900 is embedded in a VLIW between a load instruction 924 and a MAU instruction 928. It is noted that when loading an instruction having the basic instruction format 900 into a VLIW slot the group bit field 902 and unit bit field 904 are used to locate the correct slot position in the VLIW and are not required to be stored in the VLIW as the slot position provides sufficient slot specific information to support the decode and execute pipeline stages. Consequently, only 28-bits of the initial 32-bit type-x instruction formal are stored in a VLIW. This background is provided to consider the super-set extensions to this basic format. One example of such a format is shown in FIG. 9C, where two ALU instructions in adjacent TVIM locations are shown with one of the ALU instructions being a type-x instruction format 934 with 28-bits arranged within a super-set instruction formatting space.

In an example of an LTV1 load sequence, the transform element 835 follows the LTV1 instruction. After the transform element 835, follows a number of instructions, some of which may be identified by transform element 835 to be transformed. For the purposes of this example, at least one of the InstrCnt instructions is a type-x ALU instruction. To transform the type-x ALL instruction and create a super-set ALL instruction, the transform element 835 provides an Atype bit field 856 and five transformation bits 858, 860, 862, 864, and 866. The Atype bit field 856, among its possible meanings, specifies a transformation by extending specific bit fields of the type-x ALL instruction.

FIG. 9C also illustrates two ALU slots 930 in adjacent TVIM locations where one of the two ALU slots contains a type-x ALU instruction 934 and the other slot contains a super-set ALU instruction 936. The width of each instruction is specified by a bit-width field 938. In the illustrated case, the width of the super-set instruction is 33-bits. The three bit bit-width field 938 and the 33-bit super-set instruction width, determines the VLIW ALL slot instruction width to be 36-hits, A bit-width field 938 of, for example, 000 indicates a type-x 28-bit instruction, such as ALU instruction 934, with the bit fields 940, 942, 944, 946, and 948 not used (nu). In one approach, the bit fields 940, 942, 944, 946, and 948 can be specified as "0" indicating an inactive state and with such inactive state defined in the instruction set architecture. A bit-width field 938 of, for example, 001 indicates a super-set 33-bit instruction, such as ALU super-set instruction 936, with bit fields 950, 952, 954, 956, and 958 being supplied by bits 858, 862, 864, 866, and 860, respectively, of the transform element 835. In more detail, it is noted that bit 31 950 takes the value of the AO7 bit 858 expanding the 6-bit ALU opcode of a type-x ALU instruction to a 7-bit ALU opcode 960. Bit 24 952 takes the value of the Rt5 bit 862 for expanding the target register address Rt from a 5-bit address to a 6-bit address 962, bit 18 954 takes the value of the Rx5 bit 864 for expanding the source register address Rx from a 5-bit address to a 6-bit address 964, and bit 12 956 takes the value of the Ry5 bit 866 for expanding the source register address Ry from a 5-bit address to a 6-bit address 966. The last transformation bit, bit 3 958, takes the value of the D4 bit 860 for expanding the data type field from a 3-bit field to a 4-bit field 968 supporting double the number of packed data type encodings. If all VLIW slots only supported two instruction formats in a particular implementation only a single bit would be needed to support the bit-width definition of the slot formats, instead of the three bit-width field 938. As illustrated, up to eight formats can be supported with the three bit bit-width field 938.

It has previously noted that five of the Table-3 transform bit field format encodings 000-100 identify formats where all the transform element bits beyond the transform bit field are used to transform a specific instruction. For these five formats, it is noted that with a 32-bit transform element there can be up to 29 bits that can be applied for extension to an existing instruction format. In considering how to use the 29 bits for expansion purposes, the type-x instruction to be transformed is examined to determine which bit fields can be expanded for a particular implementation. For example, the arithmetic type-x 32-bit instruction format 900 includes the group bits 902, unit bits 904, and other instruction specific 28-bits. As indicated earlier, the group bits and unit bits are useful for determining the slot position to load an arithmetic instruction, but are not necessary to load into a VLIW slot. Consequently, only 28-bits of an arithmetic instruction in an LTV1 sequence of instructions are needed to be loaded into a selected VLIW slot. In a transformation operation the LTV1 sequence specifies the loading of up to 28-bits of a type-x 32-bit instruction and selected bits of the transform element 835. For those instructions selected for transformation, such as an arithmetic instruction of the type-x basic arithmetic instruction format 900, up to 28-bits plus 29-bits, or 57-bits can be defined for the super-set arithmetic instruction.

As an example, ALU transform element 970 is used to transform an ALU type-x instruction, as specified by the transform bit field 971 encoding of 010. A type field, such as Atype 972 is used allowing the flexibility to specify, for example, multiple formats for super-set ALU instructions. In the specific example of ALU transform element 970, an A07 operand bit 973 is used to expand the type-x 6-bit opcode, such as opcode 906, to a 7-bit opcode, thereby doubling the available operand space. Each operand field, such as Rt 908 for bits Rt4-Rt0, Rx 910 for bits Rx4-Rx0, and Ry 912 for bits Ry4-Ry0, is transformed to a 12-bit operand address field by use of additional bits Rt11-Rt5 of Rt extension bit field 974, additional bits Rx 11-Rx5 of Rx extension bit field 975, and additional bits Ry11-Ry5 of Ry extension bit field 976. Conditional execution bits, such as CE3 914, are transformed from the 3-bit CE3 bit field 914 to a four bit CE4 by use of bit C4 977. The data type field is transformed from a 3-bit data type field, such as a 3-bit Dtype 916, to a four bit data type field by use of bit D4 978.

Figure 9E:
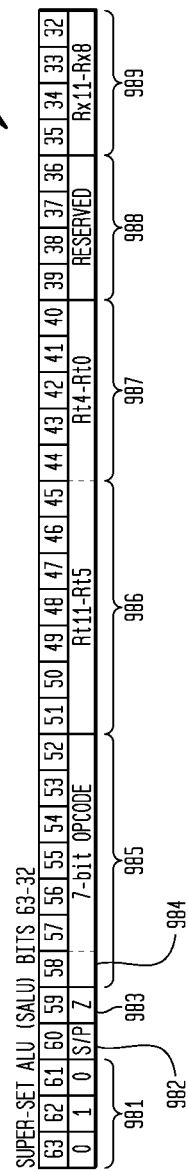
FIG. 9E illustrates a first portion of a 64-bit transformed super-set ALU (SALU) instruction in accordance with the present invention.
Figure 9F:
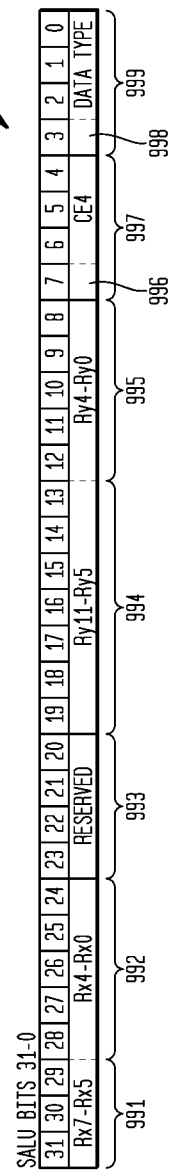
FIG. 9F illustrates a second portion of a 64-bit transformed SALU instruction in accordance with the present invention.

An example of a super-set ALL instruction (SALU) using the transform element 970 is shown in two parts for a 64-bit instruction VLIW slot width. SALU bits 63-32 for an instruction format 980 are shown in FIG. 9E and SALU bits 31-0 for an instruction format 990 are shown in FIG. 9F. The bits and bit fields are accounted for as follows. Bit-width field 981 is set to a 64-bit width setting, such as, for example, 010. The S/P bit 982 comes directly from the ALU type-x instruction S/P bit 903. The Z bit 983, is a reserved bit. A07 bit 973 from the transform element 970 supplies bit-58 984 which is the seventh bit of the opcode field 985. Rt extension bit field 974 from the transform element 970 supplies Rt11-Rt5 bits 51-45 986 and bits Rt4-Rt0 908 from the ALU type-x instruction 900 supplies bits 44-40 987 to form the 12-bit Rt field. Rx extension bit field 975 from the transform element 970 supplies Rx11-Rx5 bits 35-32 989 and bits 31-29 991 and bits Rx4-Rx0 910 from the ALL type-x instruction 900 supplies bits 28-24 992 to form the 12-bit Rx field. Ry extension bit field 976 from the transform element 970 supplies Ry11-Ry5 bits 19-13 994 and Ry4-Ry0 912 from the ALL type-x instruction 900 supplies bits 12-8 995 to form the 12-bit Ry field. C4 977 from the transform element 970 supplies bit 7 996 and CE3 914 from the ALU type-x instruction 900 supplies bits 6-4 to for the 4-bit CE4 field 997. D4 978 from the transform element 970 supplies bit 3 998 and 3-bit Dtype 916 from the ALL type-x instruction 900 supplies bits 2-0 to form the 4-bit data type field 999. The transformation into the super-set instruction formats, such as instruction formats 936, 980, and 990, is accomplished by merging the appropriate bits from the transform element and the type-x instruction to be transformed as described.

Another transform element option indicated in the transform format encoding description Table-3 is transform bit field encoding 1110 where the transform element bits specify transform functions for 5 slot instructions. One example of a transform function is a decode function to do a partial decode of a hierarchically defined opcode bit field to minimize VLIW slot decode timing in a decode stage prior to execution. For example, a 7-bit opcode field could be partitioned into a 4-bit instruction class portion and a 3-bit instruction subclass field. The 4-bit instruction class portion could be decoded early prior to loading an instruction into its appropriate VLIW slot thereby aiding final decoding operation and timing after the VLIW is selected for execution.

FIG. 10 shows an illustrative loading sequence pipeline table 1000 for loading a super-set instruction into a TVIM, such as TVIM 119, 121, 123, 125, or 603, as specified by an LTV1 instruction type. Further detailed description of the operational sequence is provided with reference to TSP 100 of FIG. 1 where B=32-bits and to logical VLIW flow 700 for an example of a suitable super-set TSP. The load sequence contains a stage for the loading of the transform element, such as transform element 835, into transform element extend registers 710-714 in the transform units 704-708. The sequence begins as follows, in cycle T 1004 fetch an LTV1 instruction and distribute the LTV1 to the SP/PE0 and array PEs latching the fetched instruction LTV1 instruction into a local instruction register (IR1), such as IR1 605. In cycle T+1 1008, the fetched LTV1 is decoded. A TVIM address 760 is generated using the LTV1's VimOffs 814 and TVIM base register Vb 816. A loadTV1mode is set, and a transform element is fetched, distributed and latched in the local IR1. In cycle T+2 1012, the transform element is loaded into extend registers 710-714 internal to the transform units 704-708. Also, in cycle T+2 1012, the first type-x instruction is fetched, distributed, and loaded into the local IR1. In cycle T+3 1016, the first type-x instruction, if it is to be transformed, is transformed by merging specified bits from the transform element stored in the extend registers 710-714 with bits from the first type-x instruction to be transformed to create a super-set instruction. Then, the super-set transformed instruction is loaded into the appropriate VLIW slot in the TVIM. If the first instruction is not to be transformed, it is formatted and loaded as a 28-bit subset of the 32-bit fetched type-x instruction format into the appropriate VLIW slot in the TVIM, for example, as illustrated with instruction 934 in FIG. 9C. Also in cycle T+3 1016, the second type-x instruction is fetched, distributed, and loaded into the local IR1. In cycle T+4 1020, the second type-x instruction is transformed and then loaded, or a 28-bit subset of the second 32-bit fetched type-x instruction format is loaded into the appropriate VLIW slot in the TVIM. Also in cycle T+4 1020, the third type-x instruction is fetched, distributed, and loaded into the local IR1. In cycle T+5 1024, the third type-x instruction is transformed and then loaded, or a 28-bit subset of the third 32-bit fetched type-x instruction format is loaded into the appropriate VLIW in the TVIM. Also, in cycle T+5 1024, the fourth type-x instruction is fetched, distributed, and loaded into the local IR1. In cycle T+6 1028, the fourth type-x instruction is transformed and then loaded, or a 28-bit subset of the fourth 32-bit fetched type-x instruction format is loaded into the appropriate VLIW in the TVIM. Also, in cycle T+6 1028, the fifth type-x instruction is fetched, distributed, and loaded into the local IR1. In cycle T+7 1032, the fifth type-x instruction is transformed and then loaded, or a 28-bit subset of the fifth 32-bit fetched type-x instruction format is loaded into the appropriate VLIW in the TVIM. Cycle T+7 1032 concludes the LTV1 load transformed VLIW pipeline sequence. The pipeline continues by fetching the next instruction after the LTV1 sequence, distributing the fetched instruction, and loading it into the local IR1.

It is noted that due to the inclusion of a transform bit field, such as transform bit field 836 and 971 located in the transform elements 835 and 970, respectively, a full 64-bits is not available for defining the super-set instructions. To provide additional flexibility, an LTV2 808 instruction uses slot specific transform bits 812 to define which instruction or instructions of a load transformed VLIW sequence are 64-bit instructions. The five slot specific transform bits 812 define for each slot execution unit instruction to be loaded in a TVIM whether it is a 32-bit Instruction, for example, as indicated by a zero value, or a 64-bit instruction, for example, as indicated by a one value. FIGS. 11A and 11B illustrate examples of 64-bit instruction formats. FIG. 11A illustrates three examples of 64-bit instruction formats where a 64-bit instruction is made up of a first 32-bit word 1102 concatenated with one of three choices for a second 32-bit word 1104, 1114, or 1122. These instruction formats are to be used with an LTV2 type instruction. For example, a first 32-bit word 1102 concatenated with a second 32-bit word 1104 results in a 64-bit instruction with three operand addresses, Rt 1106, Rx 1108, and Ry 1110. In another example, concatenating the first 32-bit word 1102 with a second 32-bit word 1114 results in a 64-bit instruction with two operand addresses, Rt 1106 and Rx 1116, and a 16-bit immediate operand 1118. In a third example, concatenating the first 32-bit word 1102 with a second 32-bit word 1122 results in a 64-bit instruction with a single operand address, Rt 1106, and a 32-bit immediate operand 1124.

An example of a 64-bit instruction making use of a 32-bit immediate operand is a super-set compare immediate instruction 1150 shown in FIG. 11B. A first 32-bit word 1152 contains expanded 7-bit opcode CMP32Icc 1156 and additional control fields specifying the compare operation such as condition compare (CC) 1160, condition combination (CCombo) 1164, and data type 1168. The first 32-bit word 1152 also specifies an operand Rt 1172 to specify the storage address of a data value to be compared to the 32-bit immediate value 1176 provided in the second word of the 64-bit instruction.

It is noted that for instructions that are to be transformed and loaded into a TVIM, the instruction formats prior to loading, as placed in a load VLIW LTV1 or LTV2 instruction sequence, do not have to be individually executable in the processor prior to being transformed. The transformation operation transforms multiple 32-bit instruction elements into larger format instructions, such as the 36-bit instruction 936, the 64-hit instructions 1100, or the compare instruction 1150.

FIG. 12 shows an LTV2 loading sequence pipeline table 1200 illustrative for loading five 64-bit transformed instructions. This LTV2 loading sequence pipeline table illustrates a sequence of fetching the LTV2 instruction followed by an overlapped three-cycle sequence for each 64-bit instruction to be loaded. The pattern that repeats is to fetch an instruction 32-bit element.A (I32b.A) and receive it into an IR1, then in the next cycle load the I32b.A into a transform unit extend register while fetching the second instruction 32-hit element.B (I32b.B) which is received into the IR1. In the third cycle I32b.A and I32b.B are combined and transformed into the correct 64-bit format and loaded into the appropriate slot in the VLIW address in the TVIM. This cycle is repeated until all five 64-bit instructions are loaded. For example, loading the second slot of a TVIM is shown in the outlined three-cycle sequence 1210. The transformation of an LTV2 sequence of instructions into transformed super-set instructions, such as the 64-bit instructions 1100 and the 64-bit compare immediate instruction 1150, is by concatenation, though other forms of transformation as previously described are not precluded.

While the present invention has been disclosed in the context of various aspects of several embodiments, it will be recognized that the invention may be suitably applied to other environments and applications consistent with the claims which follow. Processors having a secondary memory, such as a VLIW memory, for the storage of two or more instructions to be executed in parallel and which provide instructions in the program stream for loading the secondary memory, such as a load VLIW (LV) instruction, may make use of several embodiments of the present invention. By way of example, it is realized that the transformation techniques using the LTV1 and LTV2 sequence of instructions can be applied to the 16-bit type-j instructions 200 of FIG. 2. Further, the superset forms of instructions maybe decoded and then stored in a VLIW memory prior to execution selection. In addition, depending upon implementation needs, a load VLIW instruction could be defined to carry selective bits that are used for transformation of instructions rather than using a transform element.

We claim:

1. An instruction transform apparatus for transforming an instruction to a new form, the instruction transform apparatus comprising:
   an instruction cache storing instructions from which a sequence of instructions are fetched to form a very long instruction word (VLIW);
   a first instruction register for receiving the fetched sequence of instructions, the fetched sequence beginning with a decode and load instruction followed by a second instruction, wherein the decode and load instruction causes the second instruction to be transformed into a partially decoded form, wherein the second instruction is comprised of a first bit field, a second bit field, and other instruction bits, wherein a bit field represents specified bits in a preselected bit field;
   a first decode unit connected to the first instruction register selectively determining to decode the first bit field of the second instruction to a first decoded full machine level format set of bits, selectively determining to decode the second bit field of the second instruction to a second decoded full machine level format set of bits, wherein the selectively determining to decode or to not decode is in response to a specification encoded in the second instruction and wherein a transformed partially decoded form of the second instruction is created to include the other instruction bits which are not decoded, the first decoded full machine level format set of bits, and the second decoded full machine level format set of bits; and
   a transform storage unit for storing the transformed partially decoded form of the second instruction in an instruction slot of the VLIW at an address generated in response to the decode and load instruction, wherein the bit width of the transformed partially decoded form of the second instruction depends upon the selectively determining to decode or to not decode.

2. The instruction transform apparatus of claim 1 further comprising:

a second decode unit to decode bit fields not previously decoded in the transformed partially decoded form of the second type instruction to form an execution unit capable instruction;
a decode register for storing the execution unit capable instruction and having
a decoded output from the decode register.

3. The instruction transform apparatus of claim 2 further comprising:
an execution unit coupled to the decoded output and capable of receiving and executing the execution unit capable instruction.

4. The instruction transform apparatus of claim 1 further comprising:
a program storage unit for storing the decode and load instruction and the second instruction in sequential fetch order.

5. The instruction transform apparatus of claim 1 wherein each instruction of the sequence of instructions is a 16-bit instruction having a bit that indicates whether the 16-bit instruction is a control instruction for execution on a control processor or a processing element instruction for execution on one or more of a plurality of processing elements.

6. The instruction transform apparatus of claim 1 further comprising:
a second instruction register for storing the transformed partially decoded form of the second instruction that was decoded in the first decode unit; and
an instruction selector for selecting the transformed partially decoded form of the second instruction from the second instruction register or the transformed partially decoded form of the second instruction fetched from the transform storage unit for final decoding and execution.

7. The instruction transform apparatus of claim 6 wherein the instruction selector selects the transformed partially decoded form of the second instruction from the transform storage unit in response to an execute VLIW instruction.

8. A method of storing a partially decoded instruction into a very long instruction word (VLIW) storage unit, the method comprising:
fetching a sequence of instructions from an instruction cache, wherein each instruction of the sequence of instructions is used to form a VLIW;
receiving the fetched sequence of instructions in a first instruction register, the fetched sequence beginning with a decode and load instruction followed by a second instruction, wherein the decode and load instruction causes the second instruction to be transformed into a partially decoded format, wherein the second instruction is comprised of a first bit field, a second bit field, and other instruction bits, wherein a bit field represents specified bits in a preselected bit field;
selectively determining to decode the first bit field of the second instruction to a first decoded full machine level format set of bits, selectively determining to decode the second bit field of the second instruction to a second decoded full machine level format set of bits, in a first decode unit connected to the instruction register, wherein the selectively determining to decode or to not decode is in response to a specification encoded in the second instruction;
configuring a transformed partially decoded form of the second instruction by replacing the first bit field of the second instruction with the first decoded full machine level format set of bits, replacing the second bit field of the second instruction with the second decoded full machine level format set of bits, and including the other instruction bits of the second instruction; and
storing in an instruction slot of the VLIW of a transform storage unit the transformed partially decoded form of the second instruction at an address generated in response to the decode and load instruction, wherein the bit width of the transformed partially decoded form of the second instruction depends upon the selectively determining to decode or to not decode.

9. The method of claim 8 further comprising:
decoding in a second decode unit the transformed partially decoded form of the second instruction into an execution unit capable instruction; and
storing the execution unit capable instruction in a binary machine code decode register.

10. The method of claim 8 further comprising:
storing the decode and load instruction and the second instruction in sequential fetch order in a program storage unit.

11. The method of claim 8 wherein each of the sequence of instructions is a 16-bit instruction having a bit that indicates whether the 16-bit instruction is a control instruction for execution on a control processor or a processing element instruction for execution on one or more of a plurality of processing elements.

12. The method of claim 8 further comprising:
storing the transformed partially decoded form of the second instruction that was decoded in the first decode unit in a second instruction register; and
selecting in an instruction selector the transformed partially decoded form of the second instruction from the second instruction register or the transformed partially decoded form of the second instruction fetched from the transform storage unit for final decoding and execution.

13. The method of claim 12 wherein the instruction selector selects the transformed partially decoded form of the second instruction from the transform storage unit in response to an execute VLIW instruction.

14. A method for storing a partially decoded instruction in a slot in a VLIW storage, the method comprising:
fetching a decode and load instruction from an instruction cache to an instruction register, the decode and load instruction having an instruction count parameter set at least to a value two;
decoding the decode and load instruction stored in the instruction register to set a VLIW mode bit to indicate that a VLIW decode and load is active;
generating a VLIW storage address for a location in a VLIW storage to store a VLIW;
fetching from the instruction cache to the instruction register a sequence of VLIW slot instructions beginning with a first VLIW slot instruction having a first bit field, a second bit field, and a first group of other instruction bits followed by at least a second VLIW slot instruction having a second bit field, a third bit field, and a second group of other instruction bits, wherein a bit field represents specified bits in a preselected bit field;
selectively determining to decode the first bit field of the first VLIW slot instruction to generate a first decoded full machine level format set of bits and selectively determining to decode the second bit field of the first VLIW slot instruction to generate a second decoded full machine level format set of bits;
configuring a partially decoded form of the first VLIW slot instruction by replacing the first bit field of the first VLIW slot instruction with the first decoded full machine level format set of bits, replacing the second bit field of the first VLIW slot instruction with the second decoded full machine level format set of bits, and including the first group of other instruction bits; and loading the partially decoded form of the first VLIW slot instruction into an associated slot in the VLIW storage at the generated VLIW storage address, wherein the bit width of the partially decoded form of the first VLIW slot instruction depends upon the selectively determining to decode or to not decode.

15. The method of claim 14, further comprising:

decoding the second bit field of the second VLIW slot instruction to generate a second decoded full machine level format set of bits and selectively determining to not decode the third bit field of the second VLIW slot instruction;

configuring a partially decoded form of the second VLIW slot instruction without the second bit field of the second VLIW slot instruction and with the second decoded full machine level format set of bits, with the third bit field, and the second group of other instruction bits; and loading the partially decoded form of the second VLIW slot instruction into an associated second slot in the VLIW storage at the generated VLIW storage address, wherein the VLIW mode bit is reset in response to loading the at least two partially decoded forms of the VLIW slot instructions based on the instruction count parameter set at least to the value of two.

16. The method of claim 14, wherein the first bit field includes the opcode field of the VLIW slot instruction.

17. The method of claim 14, further comprising:

decoding the second bit field, the third bit field, and the second group of other instruction bits of the second VLIW slot instruction to generate a fully decoded machine level form of the second VLIW slot instruction; and loading the fully decoded form of the second VLIW slot instruction into an associated second slot in the VLIW storage at the generated VLIW storage address and in response to the instruction count parameter set to at least the value of two and the loading of two slots in the VLIW storage, the VLIW mode bit is reset.

18. The method of claim 17, further comprising:

fetching the VLIW from the VLIW storage at the generated VLIW storage address wherein the second slot instruction of the VLIW is in a fully decoded machine level form; and directly executing the second slot instruction of the fetched VLIW without having a separate decode stage in response to receiving the fully decoded machine level form of the second VLIW slot instruction.

19. The method of claim 15, wherein the partially decoded form of the first VLIW slot instruction and its associated first slot have a first length, the partially decoded form of the second VLIW slot instruction and its associated second slot have a second length different from the first length.

20. The method of claim 19 wherein the first slot and the second slot have a common first bit field that specifies a type of instruction and a length of the partially decoded form of the instruction that is loaded into each slot.

21. The instruction transform apparatus of claim 1, wherein the transform storage unit stores a plurality of VLIWs and each VLIW of the plurality of VLIWs comprises a plurality of instruction slots, wherein each slot supports storage of transformed partially decoded forms of instructions having variable bit width according to specifications encoded in the instructions.

* * * * *